L. STEVENS.
PROCESS AND APPARATUS FOR COOLING CEMENT KILN GASES AND THE RECOVERY OF DUST THEREFROM.
APPLICATION FILED DEC. 29, 1915.
1,315,254. Patented Sept. 9, 1919.
2 SHEETS—SHEET 1.
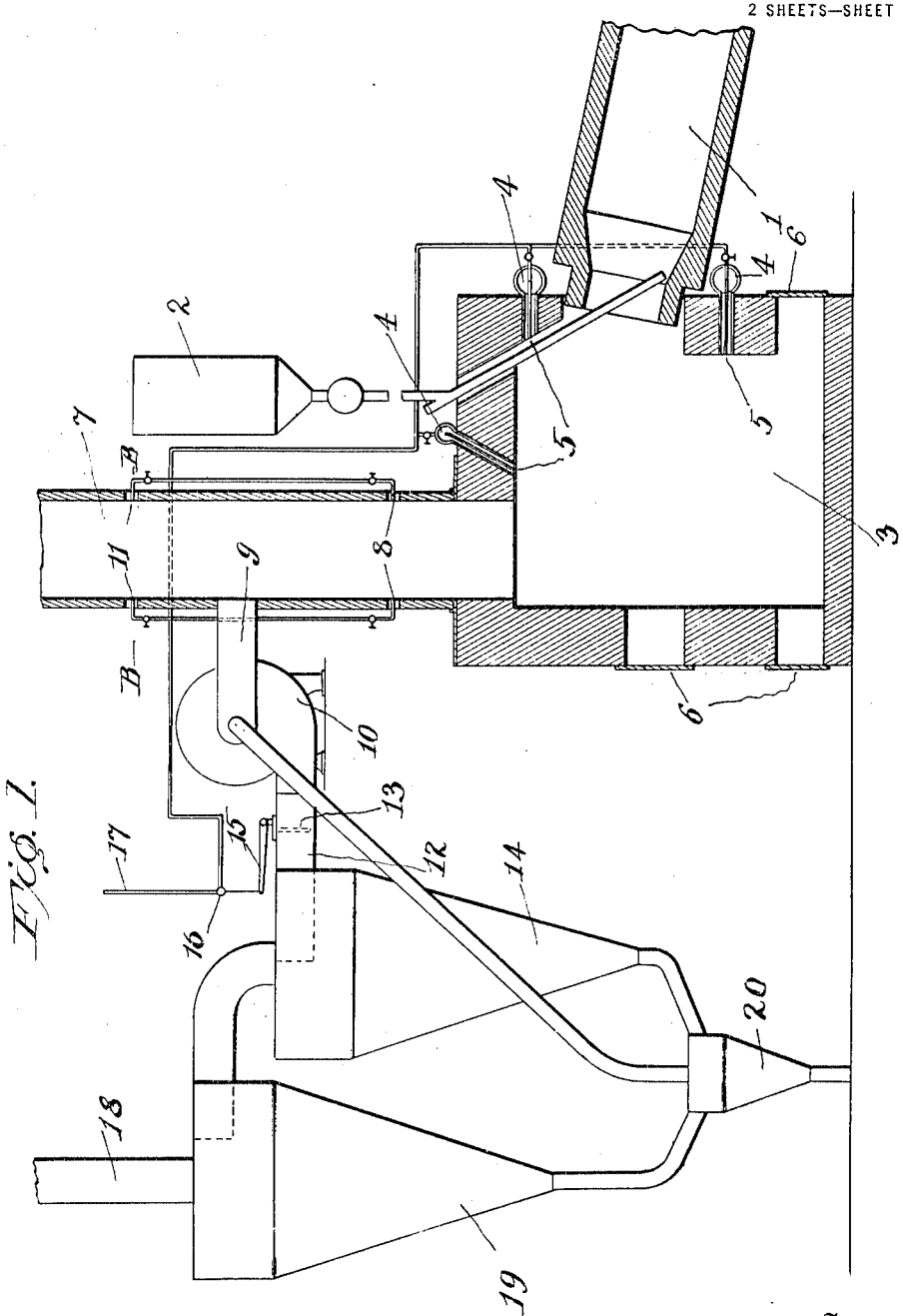

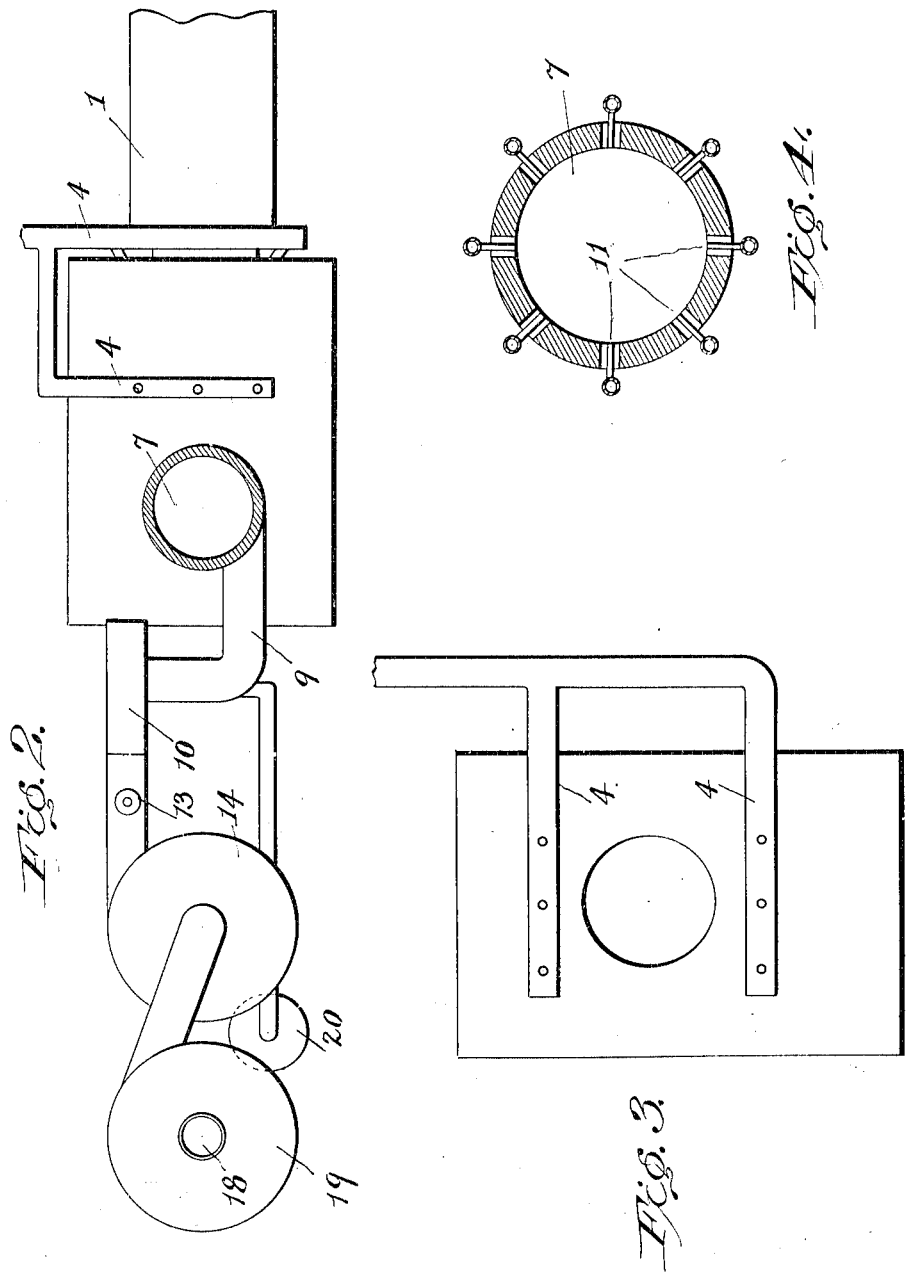

UNITED STATES PATENT OFFICE.

LEVI STEVENS, OF ALPENA, MICHIGAN.

PROCESS AND APPARATUS FOR COOLING CEMENT-KILN GASES AND THE RECOVERY OF DUST THEREFROM.

1,315,254.     Specification of Letters Patent.     Patented Sept. 9, 1919.

Application filed December 29, 1915. Serial No. 69,212.

*To all whom it may concern:*

Be it known that I, LEVI STEVENS, a citizen of the United States, residing at Alpena, in the county of Alpena and State of Michigan, have invented certain new and useful Improvements in Processes of and Apparatus for Cooling Cement-Kiln Gases and the Recovery of Dust Therefrom, of which the following is a specification.

This invention relates to the process of and apparatus for the recovery of material in the form of dust carried by the products of combustion and other gases from cement kilns.

The objects of my invention are to reduce the temperature of the gases from cement kilns sufficiently to permit them to be handled by exhaust fans and dust-separators, to recover the dust and suspended matter in a physically dry condition suitable for immediate or future use, and to discharge the products of combustion and other gases from a cement kiln combined with the cooling agents practically free from suspended matter.

In the accompanying drawings:

Figure 1 is a vertical longitudinal section through the rear end of a cement kiln, housing and stack, showing air ports, spray-pipes, exhaust fan and connections to dust-separators.

Fig. 2 is a plan looking downward upon Fig. 1, showing general location of apparatus and connections.

Fig. 3 is a partial side view of the gas-receiving chamber, showing location of air ports and spray-pipes.

Fig. 4 is a section on lines B B Fig. 1, showing arrangement of spray-pipes in kiln stack.

In Fig. 1, the cement kiln 1, is supplied with powdered cement making material from feed 2, in the usual manner. The products of combustion, and other gases carrying dust and suspended particles of raw cement making material pass from the cement kiln into housing or chamber 3, wherein they are commingled with a regulated supply of atmospheric air, which has been brought to a desirable point of saturation by water jets 5, injected into the gases by suitably located air ports, jets, or equivalent means 4, 4, 4, atmospheric air also being commingled with the gases by being drawn through doors 6, 6, 6, as hereinafter described.

The partially cooled kiln gases combined with atmospheric air and water vapor are drawn from housing 3, by stack 7, where the rapidly ascending gases are sprayed with a regulated quantity of water by suitably located spray-pipes 8, (Figs. 1 and 4.)

The kiln gases, atmospheric air and water vapors are drawn from stack 7, by exhaust fan 10, through connecting pipe 9. As shown in Fig. 2, the pipe 9 has its exit arranged tangentially to the stack 7, so that the gases while within the stack are given a rotary or whirling motion, which thoroughly mixes and combines together the kiln gases, the atmospheric air and the water from the cooling sprays, and breaks up any stratification so that the gas stream is brought to a uniform temperature throughout. In this invention the quantity of water is so regulated that no more than can be completely vaporized is introduced into the gases. The exhaust fan 10, is driven by a variable speed motor and is of such capacity that it can withdraw from the stack 7 not merely the mixture of gases and vapors from the chamber 3, but may also cause a current of atmospheric air to descend the stack 7. This additional current of cooling atmospheric air may, if desired, be brought to any desirable point of saturation, by injecting a regulated quantity of water through the spray pipes 11, as may be required by the varying kiln conditions.

As this current of cool or saturated atmospheric air is traveling in an opposite direction to the rapidly ascending current of kiln gases, these opposing streams meet at connection 9, and are combined and thoroughly mixed by the rotary or whirling motion imparted to the gases by the tangentially located connection 9, which perfects the cooling of the kiln gases so that they may be safely handled by exhaust fan 10.

The exhaust fan 10, placed between stack 7, and the dust separators, acts as a mechanical mixing chamber in which any particles of water not converted into steam will be brought into intimate contact with the gases and converted into steam by the heat of such gases; and as it is operated by a variable speed motor, any desired amount of draft may be had to draw cooling streams of atmospheric air downward through the stack 7, or through openings 6, 6, in housing 3.

The stack, 7, is left open at its top and no dampers, baffles or equivalent means are used in the stack housing. Should there be any stoppage of the dust-separating apparatus, the stack 7 provides an automatic means of keeping the kiln in continuous operation by allowing the kiln gases to pass off from the top of the stack in the usual manner.

In the connection 12, between exhaust fan 10, and dust-separator 14, is located a thermostat regulator 13, of any suitable construction, which controls the amount of water applied to cool the kiln gases by spray-pipes 5, 8, and 11. The thermostat, by any suitable lever system, herein diagrammatically shown by one lever 15, controls valve 16 in the main water supply-pipe 17, this valve being opened as the heat of the gases increases and closing as the heat of the gases decreases, the regulation being so adjusted that the amount of water applied to cool the kiln gases will all be converted into steam and pass off, as such, through the stack 18 of the dust-separator.

The cooled dust-laden gases drawn from stack 7, by exhaust fan 10, are passed to dust-separators 14, 19, and 20, three separators being shown, although one or more may be used as found necessary. In these dust-separators, the dust and particles of cement-making material are separated from the cooled products of combustion, gases, and steam produced by cooling sprays, in a physically dry condition suitable for immediate or future use, the products of combustion, gases, and steam, produced by the cooling sprays, passing off through stack 18.

I claim:—

1. The process of treating cement kiln gases carrying suspended matter which consists in commingling therewith upon their exit from the kiln, a supply of air in quantities sufficient to cool said gases to a temperature at which they can be handled by an exhaust fan and passing the cooled gases from such fan through a dust separator.

2. The process of treating cement-kiln gases carrying suspended matter, which consists in commingling therewith a regulated supply of water-saturated atmospheric air in quantity sufficient to cool said gases and leave the suspended matter physically dry, passing the cooled gases through a dust-separator, and precipitating the suspended matter from said gases in a physically dry condition.

3. The process of treating cement-kiln gases carrying suspended matter, which consists in commingling therewith, immediately on their exit from the kiln, a regulated supply of water-saturated air, further commingling the gases with a current of cool air, passing the cooled gases through a dust-separator, and precipitating the suspended matter from said gases in a physically dry condition.

4. The process of treating cement-kiln gases carrying suspended matter, which consists in commingling therewith, immediately on their exit from the kiln, a regulated supply of water-saturated air, further commingling the gases with a current of water-saturated cool air, passing the cooled gases through a dust-separator, and precipitating the suspended matter from said gases in a physically dry condition.

5. An apparatus for treating cement kiln gases consisting of a conduit comprising a chamber which surrounds the delivery end of the kiln; a fan connected to said conduit; a dust separator connected to said fan and means for introducing cooling fluid into said conduit in quantities sufficient to cool said gases.

6. An apparatus for treating cement kiln gases consisting of a conduit comprising a chamber, which surrounds the delivery end of the kiln, and an open ended stack; a fan connected to said conduit; a dust separator connected to said fan and means for introducing cooling fluid into said conduit in quantities sufficient to cool said gases.

7. An apparatus for treating cement gases comprising a chamber for receiving such gases, an open-topped stack connected thereto, means for introducing air and water thereinto, and a fan connected to said stack and to a dust-separating system.

In testimony whereof I affix my signature in presence of two witnesses.

LEVI STEVENS.

Witnesses:
 FRANK JERMIN,
 R. C. WEST.